United States Patent [19]

Tuttle et al.

[11] 4,155,108

[45] May 15, 1979

[54] POLE-MOUNTED EQUIPMENT HOUSING ASSEMBLY

[75] Inventors: Lauren P. Tuttle, Herndon; Paul H. Dluehosh, Manassas, both of Va.

[73] Assignee: Telcom, Inc., Vienna, Va.

[21] Appl. No.: 864,870

[22] Filed: Dec. 27, 1977

[51] Int. Cl.² .............................................. H02B 1/04
[52] U.S. Cl. .................................. 361/331; 361/380; 174/45 R
[58] Field of Search ........................... 174/45 R, 52 R; 361/331, 332, 334, 346, 358, 359, 380, 422, 427, 428; 179/2 EC; 325/119, 185; 248/218.4, 219.3, 219.4

[56] References Cited

U.S. PATENT DOCUMENTS

| | | | |
|---|---|---|---|
| 3,268,770 | 8/1966 | Boyer | 361/380 |
| 3,312,873 | 4/1967 | Stanback | 361/359 |
| 3,502,785 | 3/1970 | Nickola | 174/45 R |
| 3,538,237 | 11/1970 | Hockaway | 174/45 R |

OTHER PUBLICATIONS

The American City, Jan. 1972, Products and Processes, p. 85.

Primary Examiner—Gerald P. Tolin
Attorney, Agent, or Firm—Rose & Edell

[57] ABSTRACT

Pole-mounted equipment is adaptable for mounting on utility poles having a wide range of diameters and is relatively vandal-proof. A first equipment housing is secured to the pole by plural U-shaped bolts, the ends of which are tightly secured to the first assembly. Mounting brackets extend from the first assembly to a length greater than the largest pole diameter in said range and are secured to a second equipment housing. The brackets thereby define a uniform spacing between the first and second housings, irrespective of pole diameter. A front panel is secured to one of said housings and is protected by an access door. A cover, in the form of two generally L-section members, protects the housing from the elements and includes inwardly-projecting studs which extend into both housings where they are appropriately secured. Openings are provided in the top of the cover to accomodate the pole. In a specific embodiment used for a remote telephone station, antennas and a solar energy absorber are mounted proximate the top of the pole and are connected to components in the housing by cables running along the pole.

12 Claims, 9 Drawing Figures

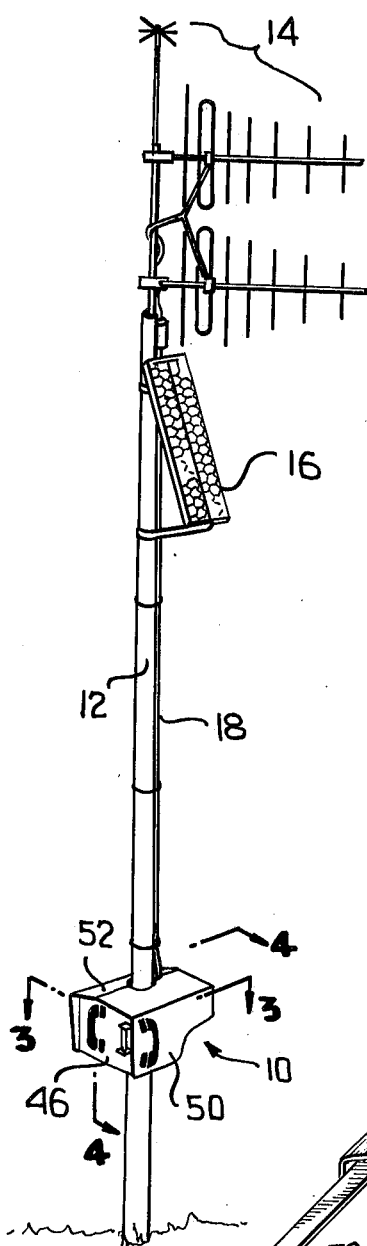
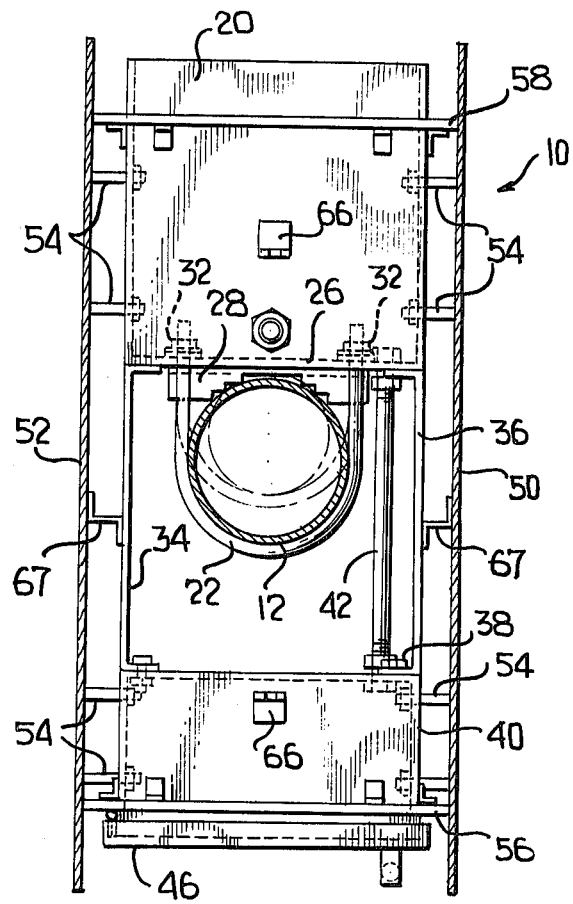
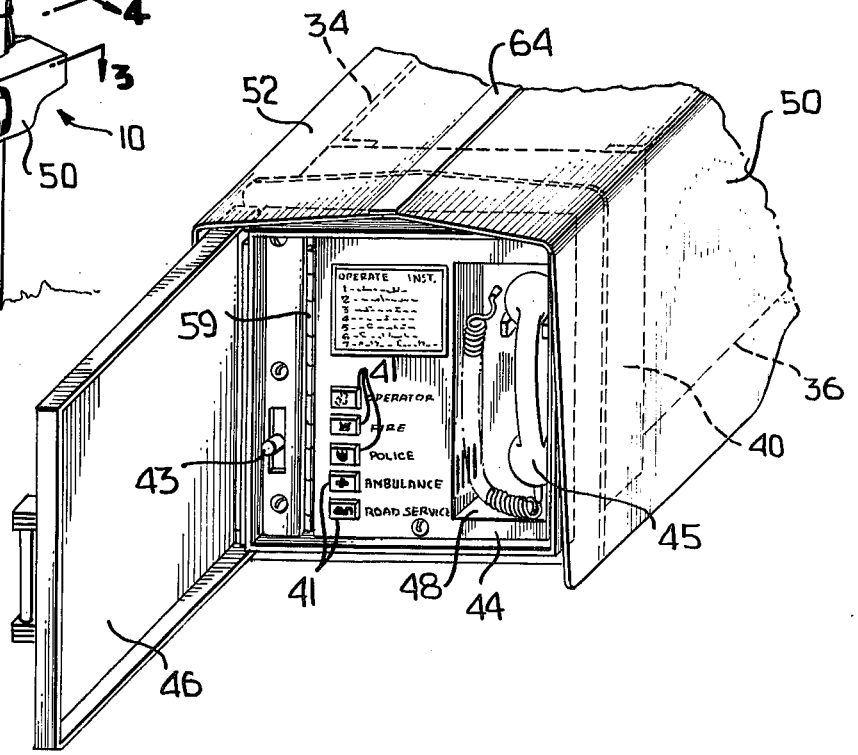

POLE-MOUNTED EQUIPMENT HOUSING ASSEMBLY

BACKGROUND OF THE INVENTION

The present invention relates to pole-mounted equipment and, more particularly, to equipment which can be mounted on poles having a wide range of pole diameters and which is simple to install and resistant to weather conditions and vandalism.

Prior art pole-mounted equipment is generally secured by means of an exposed bracket. The bracket is subject to wear and tear due to weather, and the equipment itself is readily subject to vandalism. Where attempts have been made to achieve better protection, the resulting assembly could only accommodate a narrow range of pole diameters.

It is an object of the present invention to provide an approach to pole-mounting equipment which eliminates the aforesaid prior art problems.

It is another object of the present invention to provide a mounting assembly for a remote pole-mounted radio-telephone unit which is suitable for mounting on a wide variety of pole diameters and which minimizes the effects of weather and vandalism.

SUMMARY OF THE INVENTION

In accordance with the present invention, a pole-mounted assembly includes first and second component housings. The first housing is secured to a pole by means of one or more U-bolts. Mounting brackets extend transversely of the pole and are secured to the second housing. The length of the mounting brackets thereby determines the spacing between the first and second housings, irrespective of pole size. The surface of the first housing which abuts the pole is provided with one or more pole brackets to facilitate securing the first housing to the pole. A conduit extends along the mounting brackets to carry electrical wiring between the two housings.

A cover for the assembly includes a pair of cover members, each covering a respective side and one-half of the top of the assembly. Each cover member includes studs which project into the first and second housings where they are secured in place. Thus, once the cover members are secured, removal requires access to the inside of both housings.

The assembly is suitable for long term remote and unattended operation and may include an antenna and solar energy absorber mounted atop the pole and electrically connected to components in the housings by cables running down the pole, through suitably provided access in the cover, and into one or the other of the housings.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein: FIG. 1 is a view in perspective of a utility pole having a typical assembly secured thereto in accordance with the present invention;

FIG. 2 is a partial view in perspective of the assembly of FIG. 1 showing the front door open with the control panel exposed;

FIG. 3 is a view in section taken along lines 3—3 of FIG. 1;

DESCRIPTION OF THE PREFERRED EMBODIMENT

Figure 4:
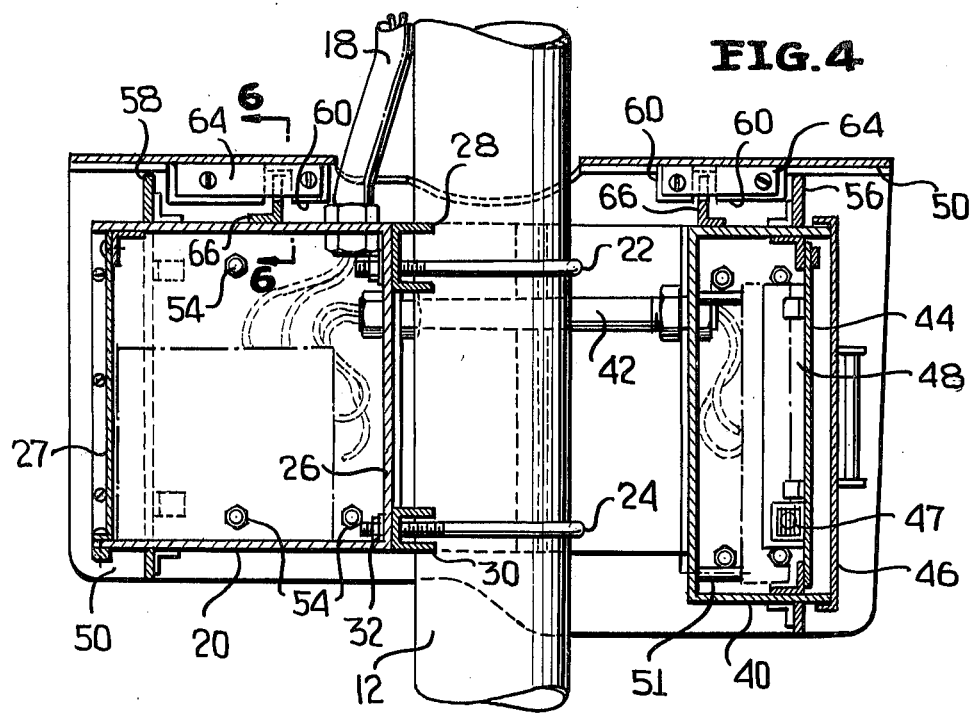
FIG. 4 is a view in section taken along lines 4—4 of FIG. 1.

Referring to FIG. 1 of the drawings in greater detail, an equipment assembly 10 is mounted on a utility pole 12. Pole 12 may be a hollow pole of aluminum or similar material, or may be solid wood, etc. For purposes of the present invention the assembly 10 is assumed to be an emergency radio-telephone unit; however, it is clear from the description which follows that the principles of the present invention are applicable to any pole-mounted equipment. An antenna assembly 14 and solar energy absorber 16 are mounted at or proximate the top of pole 12 and are electrically connected to component within assembly 10 by means of a cable 18 which extends along the pole.

Figure 5:
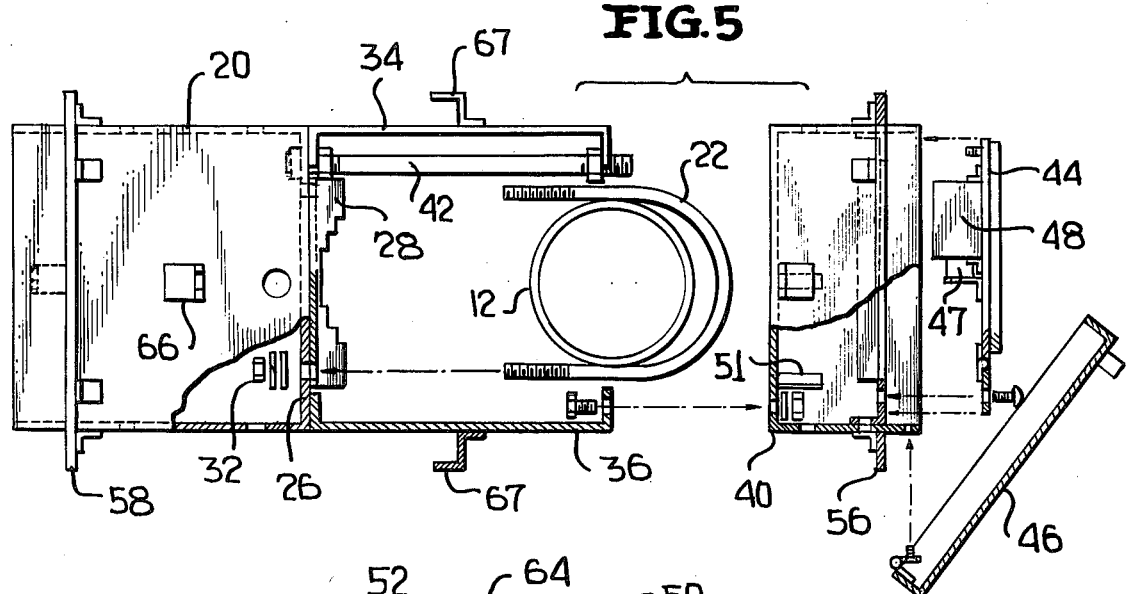
FIG. 5 is an exploded view in section, similar to FIG. 3, illustrating the manner in which the housing members are secured to one another and to the pole.
Figure 6:
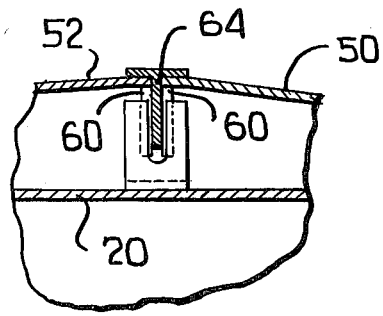
FIG. 6 is a view in section taken along lines 6—6 of FIG. 4.
Figure 7:
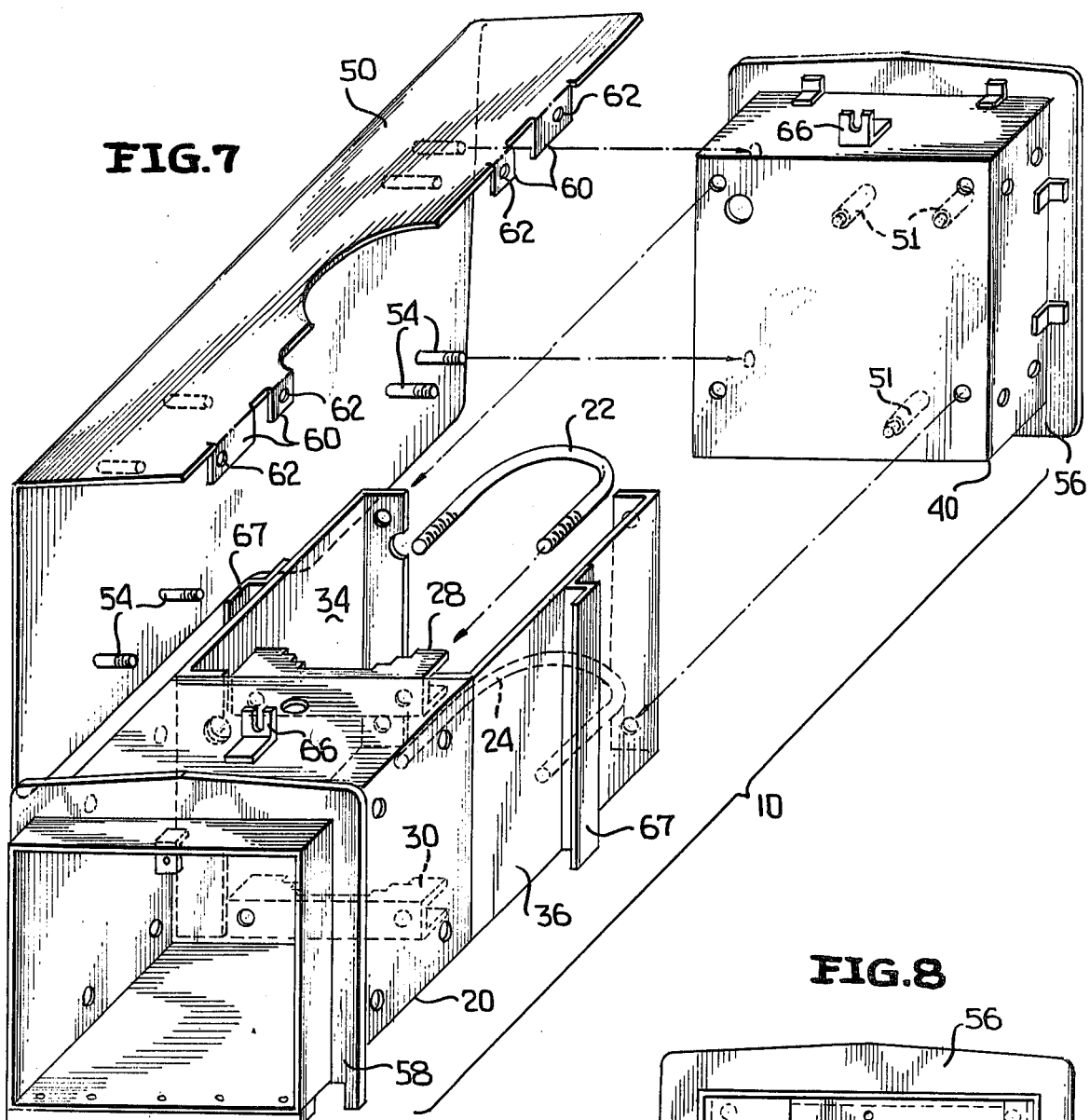
FIG. 7 is an exploded view in perspective from the rear of the assembly.
Figure 9:
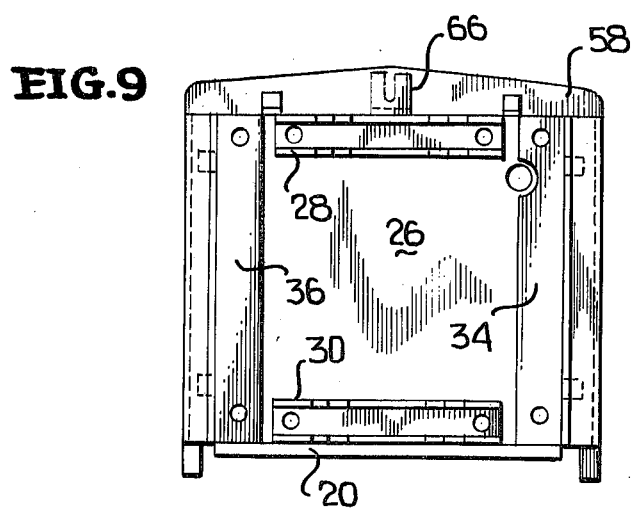
FIG. 9 is a plan view in elevation of the front of the rearward component housing.
Figure 8:
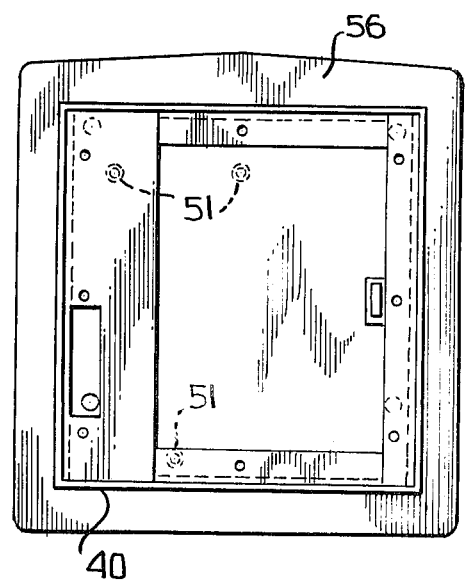
FIG. 8 is a plan view in elevation of the front of the forward component housing with the door and panel removed.

Referring to FIGS. 2 through 9, assembly 10, a power supply housing 20 is secured to pole 12 by means of a pair of U-bolts 22 and 24, as best illustrated in FIGS. 3, 5 and 7. Specifically, the forward vertical wall 26 of housing 20 has a pair of pole brackets 28, 30 mounted thereon in vertically-spaced locations. Each pole bracket 28, 30 is in the form of a U-shaped channel having its base abutting wall 26 and its legs projecting horizontally forward. Each leg of the brackets 28, 30 is centrally recessed from its outer edge in plural discrete perpendicular steps such that the pole 12 may reside in the recess. Depending upon the pole diameter, it abuts two or more step edges and, in most instances, the base of the innermost step. (The relationship of pole bracket 28 to a smaller diameter pole 12' is shown in phantom lines in FIG. 3.) With pole 12 abutting the pole brackets 28, 30 in the aforementioned recess, U-bolts 22, 24 are positioned around pole 12 with their threaded legs extending through suitably provided holes in pole brackets 28, 30 and wall 26. The threaded bolt legs are engaged by nuts 32 or the like inside housing 20 to firmly secure that housing to pole 12. With housing 20 thusly secured, pole brackets 28 and 30 provide multi-point contact with pole 12 and thereby minimize inadvertent rotational movement of the housing about the pole. The rear wall 27 of housing 20 is removable to provide access to the housing interior.

A pair of mounting brackets 34, 36 are secured to wall 26 of housing 20 and extend therefrom on opposite sides of pole 12 for a distance which is as large or slightly larger than largest diameter pole on which assembly 10 is to be mounted. An electronic component housing 40 is secured to the remote ends of brackets 34, 36 by screws 38 or the like. The spacing between housings 20 and 40 is determined solely by the length of brackets 34, 36 in their dimension transverse to the axis of pole 12, irrespective of pole diameter. In other words, by mounting housing 40 on the brackets 34, 36 rather than on pole 12, the spacing between the housings is normalized for all sizes of pole 12. A tubular member 42, co-extensive with the brackets 34, 36, serves as a protective conduit for wiring between the two housings on 20, 40.

In the emergency radio telephone assembly of the present description, housing 20 contains the battery and other power supply components while housing 40 contains the electronic transmitter, receiver and control logic components. A control panel assembly 44 is mounted (by screws or the like) on the front of housing 40. Panel assembly 44 contains various push buttons 41, an interlock switch 43, and a telephone handset 45. A front door 46 is pivotally mounted on housing 40 to protect panel 44 when the unit is not in use. The telephone handset is located in a box-like recess 48 in panel assembly 44, which recess projects into housing 40. An audio alarm 47 is secured to the back of the control panel adjacent recess 48. Various electronic components are located in a component box 49 which is bolted to the rear wall of housing 40. Hollow cylindrical spacers 51 extend between component box 49 and the aforesaid rear wall to define the location of the component box inside housing 40.

Assembly 10 is provided with a cover along its top and sides in the form of two inverted L-shaped members 50, 52, each covering a respective side and half of the top of the assembly. A plurality of studs 54 extend from the inner surface of members 50, 52 through suitably provided holes in housings 20 and 40. The ends of studs 54 are threaded and are engaged by nuts interiorly of housings 20 and 40. A cover spacer 56, in the form of a thin frame surrounding all four sides of housing 40, combines with another cover spacer 58, in the form of a thin frame surrounding the top and sides of housing 20, to support members 50, 52 in spaced relationship to the two housings. A portion of the upper edge of each of members 50, 52 is bent downward at right angles to form a plurality of tabs 60. The tabs 60 are apertured at 62 and each tab aperture 62 in member 50 is aligned with a similar tab aperture in member 52. Flat strip member 64 cover joint where the upper edges of members 50 and 52 meet. In the region of tabs 60, strip 64 has a T-shaped cross-section, the stem of which depends from the strip to a position between the opposed tabs 60 of members 50 and 52. Suitable holes are provided in the depending portion of the strip and are aligned with tab apertures 62 so that strip 64 and members 50 and 52 can be joined together. Bifurcated guide members 66, located centrally atop housings 20 and 40, receive the depending stem of strip 64.

In securing assembly 10 to pole 12, housing 20 is first mounted at the proper height using U-bolts 22 in conjunction with pole brackets 28 and 30 in the manner described above. Housing 40 is then secured to the brackets 34 and 36 and panel 44 is partially secured to the housing 40 so that the panel can be swung open on hinges 59. Wiring interconnections between the various units are then made, after which the door 46 is secured to the housing 40. Cover members 50, 52 are then joined together and to strip 64 at tabs 60 around pole 12 and above the assembly, and then the cover is positioned over the unit using members 66 as positioning guides for strip 64. Threaded studs 54 on cover member 50, 52 are engaged by nut inside housings 20 and 40. Rear wall 27 of housing 20 is then secured, control panel 44 is fully secured, and the door 46 is closed.

If desired Z-shaped brackets 67 may be provided at the outer surfaces of brackets 34, 36 to provide additional support for cover members 50, 52.

Although particularly suited for roadside emergency telephone systems, the invention described herein is useful for any pole-mounted equipment. The normalization of spacing between the two housings 20 and 40 permits standardization of parts for a wide variety of pole diameters. The protective cover has all of its connecting members inside the assembly and out of sight to minimize the risk of vandalism.

While we have described and illustrated one specific embodiment of our invention, it will be clear that variations of the details of construction which are specifically illustrated and described may be resorted to without departing from the true spirit and scope of the invention as defined in the appended claims.

We claim:

1. An equipment assembly mounted on a substantially vertical utility pole, said assembly comprising:
    a first component housing;
    first securing means tightly securing said first component housing to said pole solely by urging said first component housing transversely toward said pole, said first securing means being adjustable to accommodate different utility pole widths;
    bracket means secured to said first housing and extending transversely past said pole to a predetermined distance from said first housing;
    a second component housing; and
    second securing means securing said second component housing to said bracket means;
    whereby said first and second housings are disposed on opposite sides of said utility pole and are spaced from one another by said predetermined distance.

2. The assembly according to claim 1, further comprising:
    pole bracket means, secured to said first component housing, engaging said pole and inhibiting rotation of said first housing about said pole when said first component housing is tightly secured to said pole.

3. The assembly according to claim 4 wherein said first securing means comprises U-bolt means having a base contacting said pole and legs which straddle said pole and are secured to said first component housing.

4. The assembly according to claim 1 further comprising a cable conduit, co-extensive with said bracket means, for conducting electrical wiring between said first and second housings.

5. The assembly according to claim 1 wherein said means tightly securing comprises U-bolt means having a base contacting said pole and legs which straddle said pole and are secured to said first component housing.

6. The assembly according to claim 1 further comprising:
    a control panel secured to one of said first and second housing members; and
    door means for alternatively providing closure and access to said control panel.

7. An equipment assembly mounted on a utility pole, said assembly comprising:
    a first component housing;
    means tightly securing said first component housing against said pole;

bracket means secured to said first housing and extending transversely past said pole to a predetermined distance from said first housing;

a second component housing;

means securing said second component housing to said bracket means;

whereby said first and second housings are disposed on opposite sides of said utility pole and are spaced from one another by said predetermined distance;

cover means covering the top and sides of said first and second component housings, said cover means including studs projecting therefrom into said housings; and means securing said studs to said housings.

8. The assembly according to claim 7 wherein said cover means comprises:

first and second cover members, each having an inverted generally L-shaped configuration, said cover members positioned to overlie respective sides and halves of the top of said component housings, the tops of said cover members being contoured to permit passage of said utility pole therethrough.

9. An equipment assembly mounted on a utility pole, said assembly comprising:

a first component housing;

means tightly securing said first component housing against said pole;

bracket means secured to said first housing and extending transversely past said pole to a predetermined distance from said first housing;

a second component housing;

means securing said second component housing to said bracket means;

whereby said first and second housings are disposed on opposite sides of said utility pole and are spaced from one another by said predetermined distance;

a first cover member overlying substantially one-half of the top of both of said component housings and one entire side of said housings;

a second cover member overlying the other half of the top of both of said component housings and the entire opposite side of said housings;

wherein said first and second cover members have adjacent edges extending along the top of said assembly;

wherein said adjacent edges include downward apertured tabs, the tabs and apertures therein of said first cover member being aligned with the tabs and apertures of said second cover member;

a cover strip overlying the adjacent edges of said cover members, said cover strip including an apertured stem depending therefrom between aligned tabs of said cover members, the aperture in said stem being aligned with the aligned tab apertures of said cover members; and means securing said tabs and stem together via said apertures.

10. The assembly according to claim 9 further comprising:

spacer means secured to said first and second housings and supporting said cover member a spaced distance from said housings;

guide means secured atop said first and second housings for receiving said depending stem from said strip means;

a plurality of studs projecting inwardly from each of said cover members through suitably provided openings in said housings; and means inside said housings securely engaging said studs.

11. An equipment assembly mounted on a utility pole, said assembly comprising:

a first component housing;

first securing means tightly securing said first component housing to said pole, without piercing said pole, by forcefully urging said housing transversely against the pole;

bracket means secured to said first housing and extending from said first housing transversely past said pole to a predetermined distance from said first housing;

a second component housing; and second securing means securing said second component housing to said bracket means;

whereby said first and second housings are disposed on opposite sides of said utility pole and are spaced from one another by said predetermined distance.

12. The assembly according to claim 11 wherein said second securing means comprises a U-bolt having a base portion contacting and extending partially around said pole and having legs which extend from opposite sides of said base portion and straddle said pole, said legs being secured to said first component housing.

* * * * *